TWO-CHANNEL D. C. AMPLIFIERS

Filed July 26, 1954 4 Sheets-Sheet 1

INVENTOR.
NORTON W. BELL
BY
Christie, Parker & Hale
ATTORNEYS

June 24, 1958 N. W. BELL 2,840,646

TWO-CHANNEL D. C. AMPLIFIERS

Filed July 26, 1954 4 Sheets-Sheet 2

INVENTOR.
NORTON W. BELL

BY

Christie, Parker & Hale

ATTORNEYS

June 24, 1958 N. W. BELL 2,840,646

TWO-CHANNEL D. C. AMPLIFIERS

Filed July 26, 1954 4 Sheets-Sheet 3

INVENTOR.
NORTON W. BELL

BY

Christie, Parker & Hale

ATTORNEYS

TWO-CHANNEL D. C. AMPLIFIERS

Filed July 26, 1954 4 Sheets-Sheet 4

INVENTOR.
NORTON W. BELL
BY
Christie, Parker & Hale
ATTORNEYS

United States Patent Office 2,840,646

Patented June 24, 1958

2,840,646

TWO-CHANNEL D. C. AMPLIFIERS

Norton W. Bell, Monrovia, Calif., assignor, by mesne assignments, to Consolidated Electrodynamics Corporation, Pasadena, Calif., a corporation of California Application July 26, 1954, Serial No. 445,518

5 Claims. (Cl. 179—171)

This invention relates to direct current amplifiers having two channels for amplifying high and low frequency components so as to be capable of operating over a wide band of frequencies.

Direct current amplifiers are ordinarily employed when it is necessary to amplify direct current or low frequency signals. In order to provide direct current amplification with low zero offset, synchronous modulators which convert the direct current signals to alternating current and then back to direct current after amplification are sometimes employed. Such arrangements provide accurate amplification of direct current and low frequency signals, but the high frequency response is limited. Hence the response time of the amplification system is also limited.

These difficulties are overcome in the present invention by providing a pair of amplification channels with one of the channels having an amplifier for amplifying high frequency components and the other channel having a direct current amplifier for amplifying direct current and low frequency signals. The outputs of the two channels are intercoupled so as to cause the output signals of the two channels to be added together.

Part of the signal produced by the low frequency channel is applied to the other channel so as to correct for phase shifts and amplitude variations in the low frequency channel. If a carrier amplifier is employed as the direct current amplifier, the signal which is fed from the low frequency channel to the high frequency channel also causes any leakage of the carrier signal from the carrier amplifier to be suppressed when the output signals of the two channels are added together.

Separate amplifiers may be employed in the two channels for amplifying the high and low frequency components, or a common amplifier may be employed in the two channels in order to reduce the number of tubes required.

These embodiments of the invention provide direct current amplifiers which are capable of operating over a wide band of frequencies and which have a rapid response time.

The invention is explained with reference to the drawings, in which:

Fig. 1 shows an embodiment of the invention in which separate amplifiers are provided in the high and low frequency channels, and in which part of the signal produced by the low frequency channel is applied to the other channel so as to correct for deviations in amplification in the low frequency channel.

Figure 1:
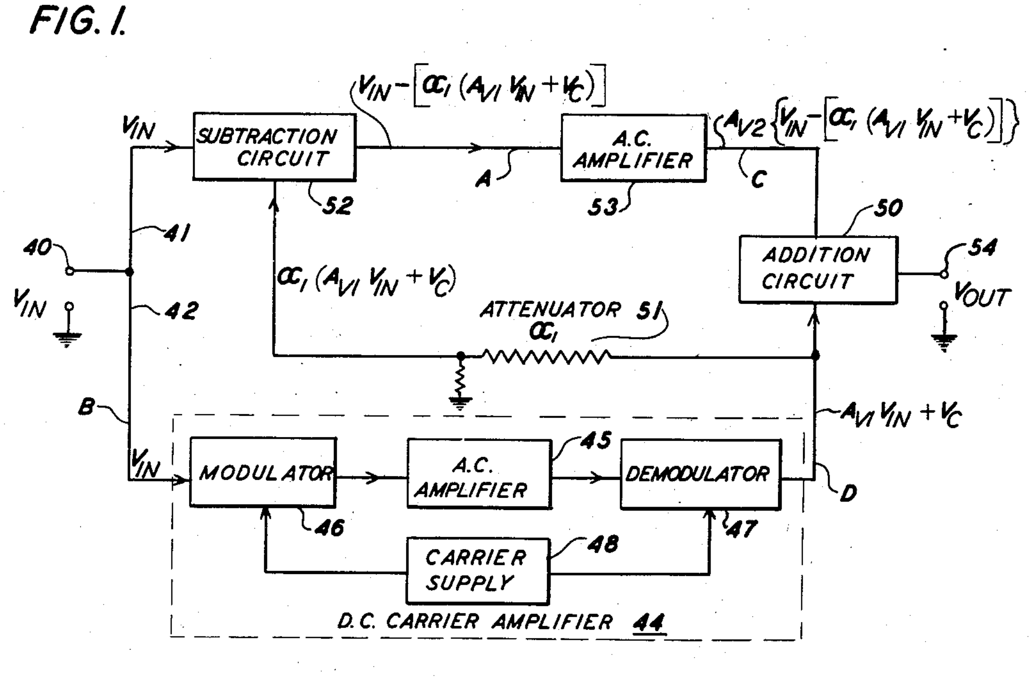
Fig. 1 is a block diagram showing an embodiment of the invention in which separate amplifiers are provided in the two amplification channels.

An input circuit 40 is coupled to a high frequency channel 41 and to a low frequency channel 42. The low frequency channel is provided with a direct current carrier amplifier 44 which comprises a conventional A. C. amplifier 45 having a chopper or modulator 46 coupled to its input and a chopper or demodulator 47 coupled to its output. A carrier supply 48 serves to actuate the modulator and the demodulator in synchronism.

The output of the direct current amplifier is applied to an addition circuit 50 and also to an attenuator 51. The output of the attenuator and the input signal which is provided over the channel 41 are applied to a subtraction circuit 52, and the output of the subtraction circuit is applied to an A. C. amplifier 53. The output of the amplifier 53 is applied to the addition circuit 50 so that the signal which is produced at the output terminal 54 is equal to the sum of the signals provided at the output of the direct current amplifier 44 and at the output of the A. C. amplifier 53.

Figure 2:
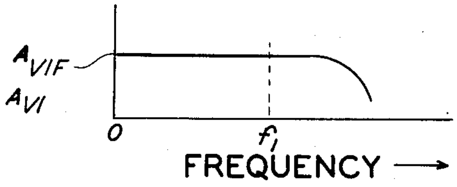
Figs. 2 and 3 are curves illustrating the operation of the apparatus of Fig. 1.
Figure 3:
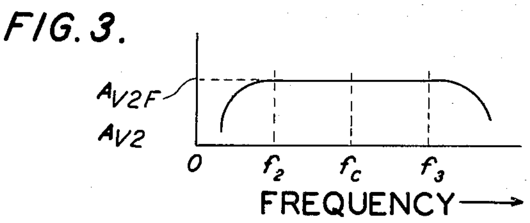

The direct current amplifier has a voltage amplification of $A_{V1} \angle \phi$ in general and $A_{V1F} \angle 0°$ in its flat region up to $f_1$ C. P. S., as illustrated in Fig. 2. The voltage $V_c$ which is shown in Fig. 1 at the output of the direct current amplifier represents the carrier leakage signal. The A. C. amplifier 53 has a voltage amplification of $A_{V2} \angle \theta$ in general and $A_{V2F} \angle 0°$ in its flat region between $f_2$ and $f_3$ C. P. S., as shown in Fig. 3. The frequency $f_c$ shown in Fig. 3 represents the frequency of the carrier leakage signal.

The signal which is produced at the output circuit 54 may be designated as follows:

$$V_{OUT}=[A_{V1}V_{IN}+V_c]+A_{V2}\{V_{IN}-[\alpha_1(A_{V1}V_{IN}+V_c)]\}$$

If certain design requirements are met, the output of the amplifier will be an amplified duplicate of the input. These requirements are:

$$f_1>f_2,\ f_3>f_c>f_2,\ A_{V1F}=A_{V2F},\ \alpha_1=\frac{1}{A_{V1F}}$$

If these conditions are fulfilled, the output voltage $V_{OUT}$ equals $A_{V1F}V_{IN}$.

The design requirements for the amplifier then are:

(1) The flat gain regions of the two amplifiers should overlap.

(2) The carrier and its harmonics should all lie within the flat gain region of the A. C. amplifier.

(3) The amplification of both amplifiers should be the same in their flat regions.

(4) The resistive attenuator should have a voltage attenuation ratio equal to the amplification of the direct current amplifier in its flat region.

With such an arrangement the amplifiers are connected so that deviations in the amplification of the direct current carrier amplifier are exactly compensated by the A. C. amplifier 53, so as to correct for phase shifts and amplitude variations in the low frequency channel. Also, any leakage of the carrier signal from the direct current amplifier is suppressed when the output signals of the two channels are added together.

Figure 4:
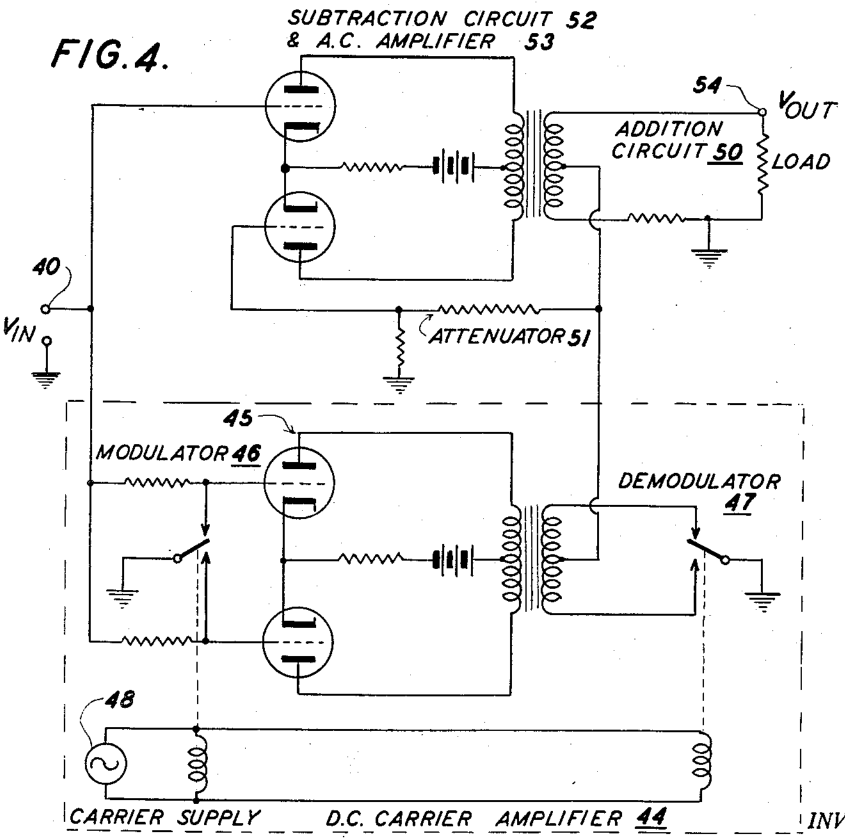
Fig. 4 is a simplified schematic diagram for the apparatus of Fig. 1.

Fig. 4 shows a simplified schematic diagram of a circuit which corresponds to the block diagram of Fig. 1. The A. C. amplifier is a differential amplifier having an output which is proportional to the difference between the signals which are applied to the control grids of the two tubes. The direct current amplifier employs a similar differential amplifier, and the input signal to the amplifier is provided by a chopper-type modulator.

Figure 5:
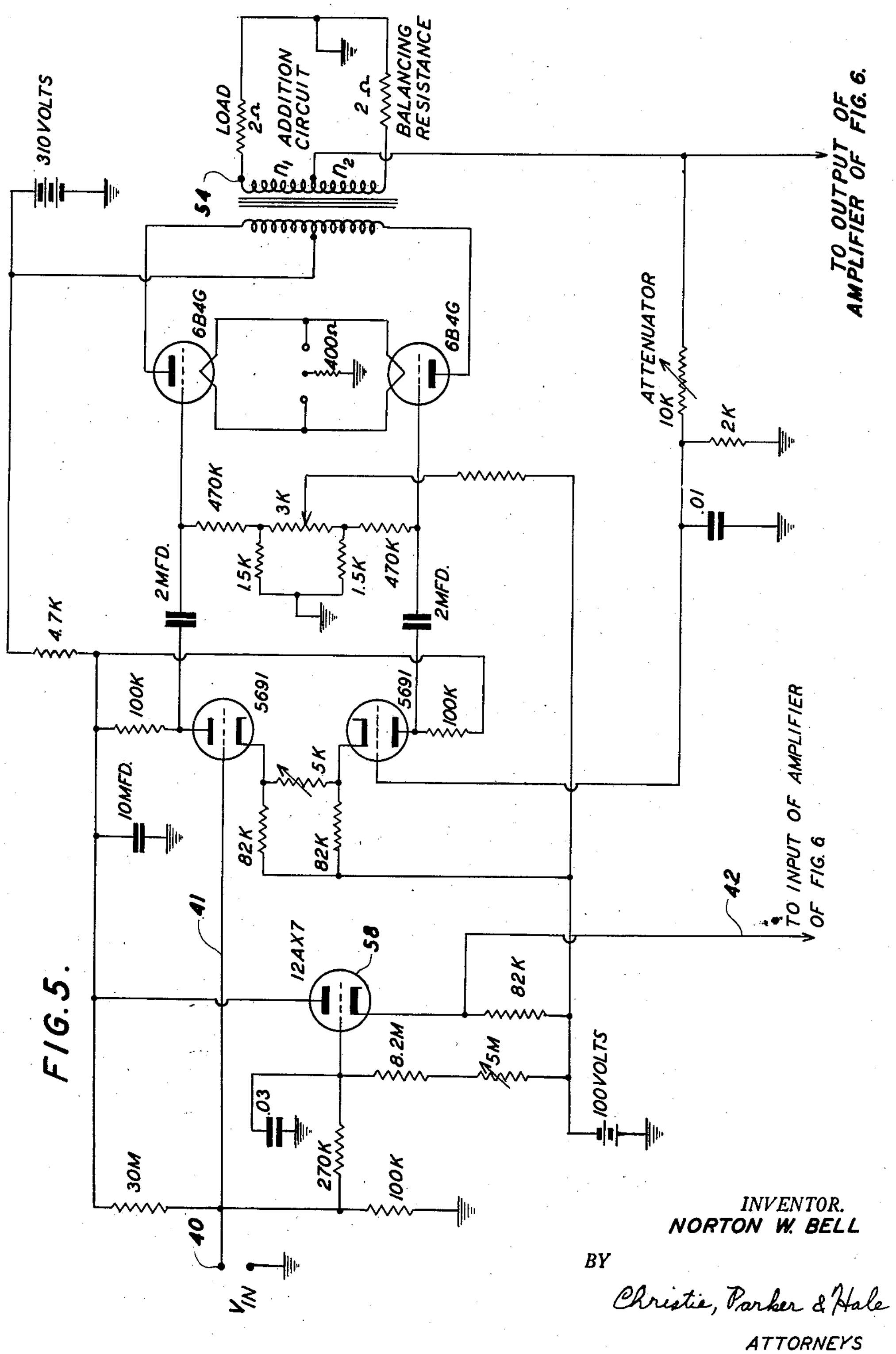
Figs. 5 and 6 show a complete schematic diagram for the apparatus of Fig. 1.
Figure 6:
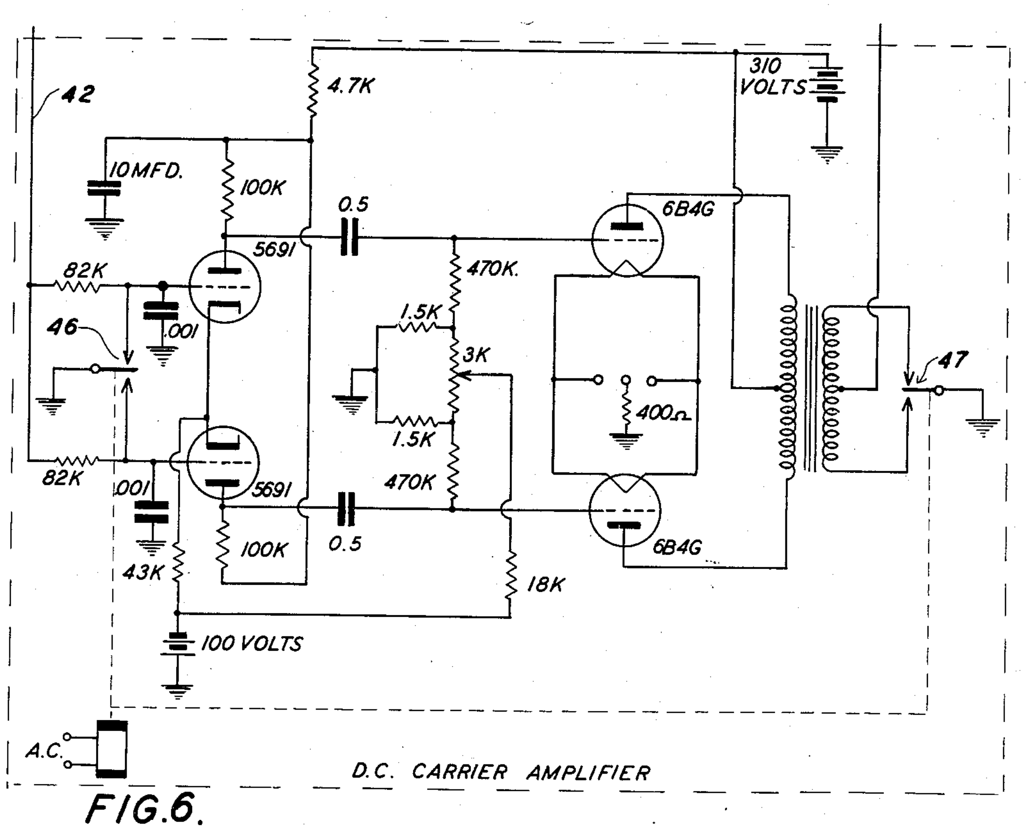

Figs. 5 and 6 show a detailed schematic diagram for the apparatus of Fig. 1. This amplifier is similar to that of Fig. 4 except that two stages of amplification are employed in each of the amplification channels instead of the single stage illustrated in Fig. 4. Also, a cathode follower tube 58 is provided to isolate the low frequency channel 42 from the high frequency channel 41.

In order to avoid interaction between the two amplification channels, the addition circuit should be arranged so that $$\frac{Z_L}{Z_B}=\left(\frac{n_1}{n_2}\right)^2$$

where $Z_L$ is the impedance of the load resistor, $Z_B$ is the impedance of the balancing resistor, and $n_1$ and $n_2$ are the number of turns in the parts of the secondary winding of the output transformer for the high frequency channel.

The frequency response of this amplifier is flat $\pm 2\%$ between D. C. and 1500 cycles per second. The peak-to-peak ripple with D. C. input was less than 2% of the D. C. output.

Figure 7:
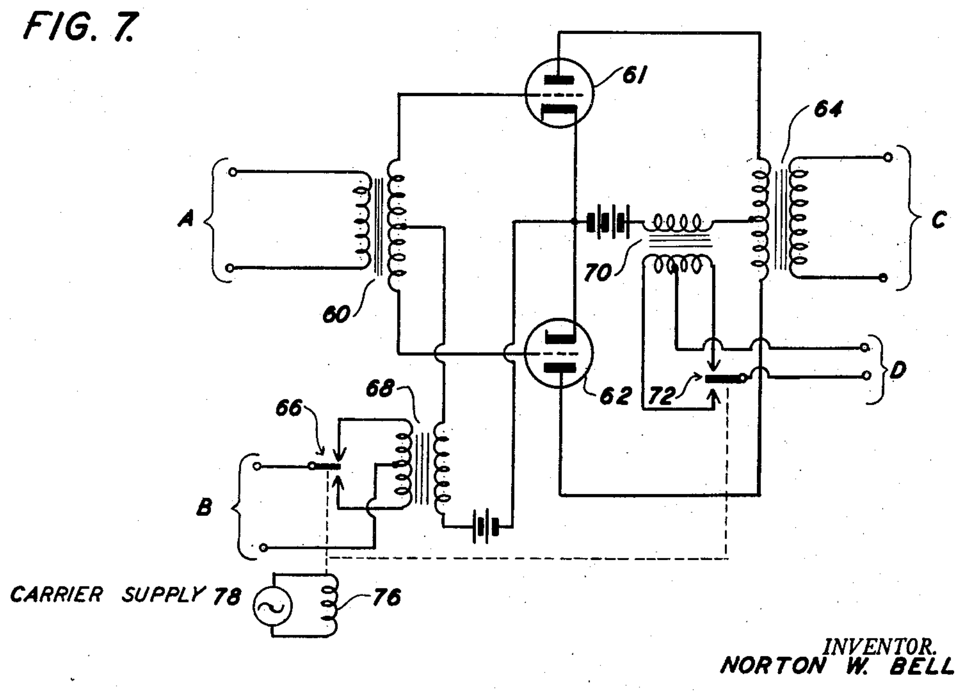
Fig. 7 illustrates how a common amplifier may be employed in the two amplification channels of the apparatus of Fig. 1.

Fig. 7 shows how a common amplifier may be employed in the high and low frequency channels of the apparatus of Fig. 1 in place of the separate amplifiers 44 and 53 illustrated in Fig. 1.

The circuits A, B, C and D of Fig. 7 correspond to the circuits which are designated by the same letters in Fig. 1, and the circuit of Fig. 7 may be employed in a circuit of the type illustrated in Fig. 1 by connecting it in accordance with the letter designations.

With such an arrangement, the high frequency channel is coupled from the circuit A through a transformer 60 to a pair of amplifier tubes 61 and 62 where the signals are amplified in push-pull. The push-pull output circuit C of the amplifier is provided at the secondary winding of a transformer 64.

The low frequency channel is coupled from the circuit B to a chopper or modulator 66 which in conjunction with a transformer 68 converts direct current and low frequency signals to alternating current signals. The output at the secondary of the transformer 68 is amplified by the tubes 61 and 62 in parallel, and it is rectified by the action of a transformer 70 and a chopper or demodulator 72.

The output C of the high frequency channel and the output D of the low frequency channel may be combined in an addition circuit to provide the desired output signal.

The two choppers 66 and 72 should be operated in synchronism so as to provide proper rectification or demodulation of the direct current and low frequency components. Preferably, the arms of the two choppers are actuated by a common coil 76 which is provided with alternating current energy from a carrier supply 78.

Figure 8:
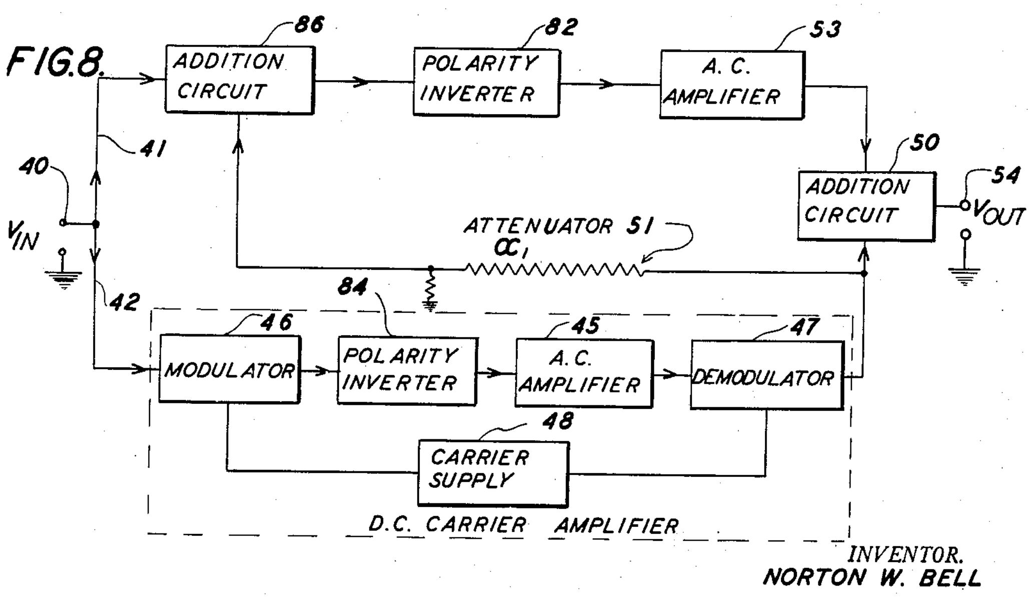
Fig. 8 is a block diagram showing a modification of the apparatus of Fig. 1.

Fig. 8 is a block diagram showing a modification of the apparatus of Fig. 1 If two polarity inverters 82 and 84 were added to the two channels of block diagram of Fig. 1, as illustrated in Fig. 8, an addition circuit 86 may be employed in the high frequency channel instead of the subtraction circuit illustrated in Fig. 1.

Ordinarily the polarity inversion can be accomplished by reversing the connections of one winding of one of the transformers in the amplification channel. Any suitable type of addition circuit may be employed. Since such circuits are well known, they will not be described in detail here. The other components of the circuit of Fig. 8 are the same as those discussed above with reference to Fig. 1.

A conventional direct current amplifier may be employed in place of the direct current carrier amplifiers shown in Figs. 1 and 8, if desired.

I claim:

1. A direct current amplifier capable of operating over a wide band of frequencies comprising an input circuit, a pair of amplification channels having their inputs coupled to said input circuit, one of the channels having an amplifier for amplifying high frequency components and also having a signal combining circuit coupled between the input of the amplifier and said input circuit, the other channel having a direct current amplifier for amplifying direct current and low frequency signals, an attentuator coupled between the output of the direct current amplifier and the combining circuit and having a voltage attenuation ratio which is substantially equal to the amplification of the direct current amplifier in its flat region, an addition circuit, and means coupling the outputs of the two channels to the addition circuit to cause the output signals of the two channels to be added together.

2. The apparatus of claim 1 wherein the combining circuit is a subtraction circuit which causes the output of the attenuator to be subtracted from any signal which is applied to said input circuit.

3. The apparatus of claim 1 wherein the combining circuit is an addition circuit which causes the output of the attenuator to be added to any signal which is applied to said input circuit.

4. A direct current amplifier capable of operating over a wide band of frequencies comprising an input circuit, a pair of amplification channels having their inputs coupled to said input circuit, one of the channels having an amplifier for amplifying high frequency components and also having a signal combining circuit coupled between the input of the amplifier and said input circuit, the other channel having a direct current amplifier for amplifying direct current and low frequency signals, the amplifiers in the two channels having flat gain regions which overlap and having amplifications which are substantially the same in their flat gain regions, an attenuator coupled between the output of the direct current amplifier and the combining circuit and having a voltage attenuation ratio which is substantially equal to the amplification of the direct current amplifier in its flat region, an addition circuit, and means coupling the outputs of the two channels to the addition circuit to cause the output signals of the two channels to be added together.

5. An amplifier capable of operating over a wide band of frequencies comprising an input circuit, a pair of amplification channels having their inputs coupled to the input circuit, one of the channels having an amplifier for amplifying high frequency components, the other channel having an amplifier for amplifying low frequency components, a circuit intercoupling the output of the low frequency amplifier and the input for the high frequency amplifier for providing a signal to the input of the high frequency amplifier which is substantially equal to the signal produced at the output of the low frequency amplifier times the reciprocal of the voltage amplification of the low frequency amplifier in its flat gain region, with the signal which is coupled from the low frequency amplifier to the high frequency amplifier being out of phase with respect to the corresponding low frequency components which are applied from the input circuit to the input of the high frequency amplifier, and means intercoupling the outputs of the two channels for causing the output signals of the two channels to be added together.

References Cited in the file of this patent

UNITED STATES PATENTS

| | | |
|---|---|---|
| 1,749,045 | Nyquist | Mar. 4, 1930 |
| 2,255,642 | Artzt | Sept. 9, 1941 |

FOREIGN PATENTS

| | | |
|---|---|---|
| 459,723 | Great Britain | Jan. 13, 1937 |